United States Patent [19]
Ryburn
[11] 3,863,226
[45] Jan. 28, 1975

[54] CONFIGURABLE COMMUNICATIONS CONTROLLER HAVING SHARED LOGIC FOR PROVIDING PREDETERMINED OPERATIONS

[75] Inventor: Scott W. Ryburn, Lexington, Mass.
[73] Assignee: Honeywell Information Systems, Inc., Waltham, Mass.

[22] Filed: Jan. 2, 1973
[21] Appl. No.: 320,380

[52] U.S. Cl. .............................. 340/172.5, 235/154
[51] Int. Cl. .............................. G05f 3/00, G06f 5/00
[58] Field of Search ............ 340/172.5; 235/61.6 R, 235/61.6 H, 154

[56] References Cited
UNITED STATES PATENTS

| | | | |
|---|---|---|---|
| 3,452,330 | 6/1969 | Avery | 340/172.5 |
| 3,482,213 | 12/1969 | Bennett et al. | 340/172.5 |
| 3,516,069 | 6/1970 | Bray et al. | 340/172.5 |
| 3,710,327 | 1/1973 | Books et al. | 340/172.5 |

*Primary Examiner*—Thomas J. Sloyan
*Attorney, Agent, or Firm*—John S. Solakian; R. T. Reiling

[57] ABSTRACT

The apparatus of the invention includes receive logic for converting serial bit characters to parallel bit characters and transmit logic for providing a parallel to serial bit character conversion. The receive and transmit logic are coupled between a processor and a communication line. Both the transmit and receive logic are coupled with a code unit which performs specified logic operations in response to the identity of the characters either received or transmitted. The apparatus is easily configurable for different bit length characters and the code unit is time-shared by the transmit and the receive logic.

18 Claims, 4 Drawing Figures

CONFIGURABLE COMMUNICATIONS CONTROLLER HAVING SHARED LOGIC FOR PROVIDING PREDETERMINED OPERATIONS

BACKGROUND OF THE INVENTION

The apparatus of the present invention generally relates to communications apparatus and more particularly to communications apparatus coupled to provide specified operations for characters transferred between a data processor with a communication line.

In the prior art, various devices are utilized to process data between a single communication line and a data processor. In providing synchronous operation of such communication line with the processor, additional considerations are required such as for example, sending synchronous characters when the processor has not had sufficient processing time to provide data for transfer and in addition upon receiving such synchronous characters, deleting them from the message in order to minimize overhead which would be required by the processor in processing such sync characters. In identifying the various characters which provide the control of such logic operations, the prior art has utilized separate logic for each of the logic units used in transmitting and receiving characters. Further in the prior art, in order to provide proper synchronization, the character length or the number of bits in a character has had to be adapted for so that synchronization could be maintained. Such prior art has utilized complicated and difficult methods for performing such configuration for the character length. It has been found that the character identification logic which is required for both the transmit and receive mode of operation of such apparatus, can be shared between such logic providing that certain precautions are maintained and further that configuration for character length can be achieved by simple means.

Accordingly, it is a primary object of the invention to provide an improved communications controller having minimal logic for implementing the transmit and receive modes of operation, including character identification, and having easy and inexpensive means for configuring the controller based upon the character length.

SUMMARY OF THE INVENTION

The above and other objects of the invention are attained by providing apparatus for transferring data characters each having a plurality of bits between a data processor and a communication line. The apparatus includes receive logic, transmit logic, and a code unit. The receive logic is utilized for converting bit serial characters received from a line to bit parallel characters. The transmit logic is utilized for converting the bit parallel characters to bit serial characters for transfer over the line. The code unit is coupled to receive the bit parallel characters either in the receive logic or the transmit logic. The code unit includes apparatus for detecting the identity of such characters and further apparatus for performing predetermined logic operations in response to the identity of certain ones of the characters. Both the receive and transmit logic may include a configuration device for utilization therein in order to provide for the different character lengths being transferred.

BRIEF DESCRIPTION OF THE DRAWINGS

The manner in which the apparatus of the present invention is constructed and its mode of operation will best be understood in light of the following detailed description, together with the accompanying drawings in which.

DETAILED DESCRIPTION OF THE PREFERRED EMBODIMENTS

Figure 1:
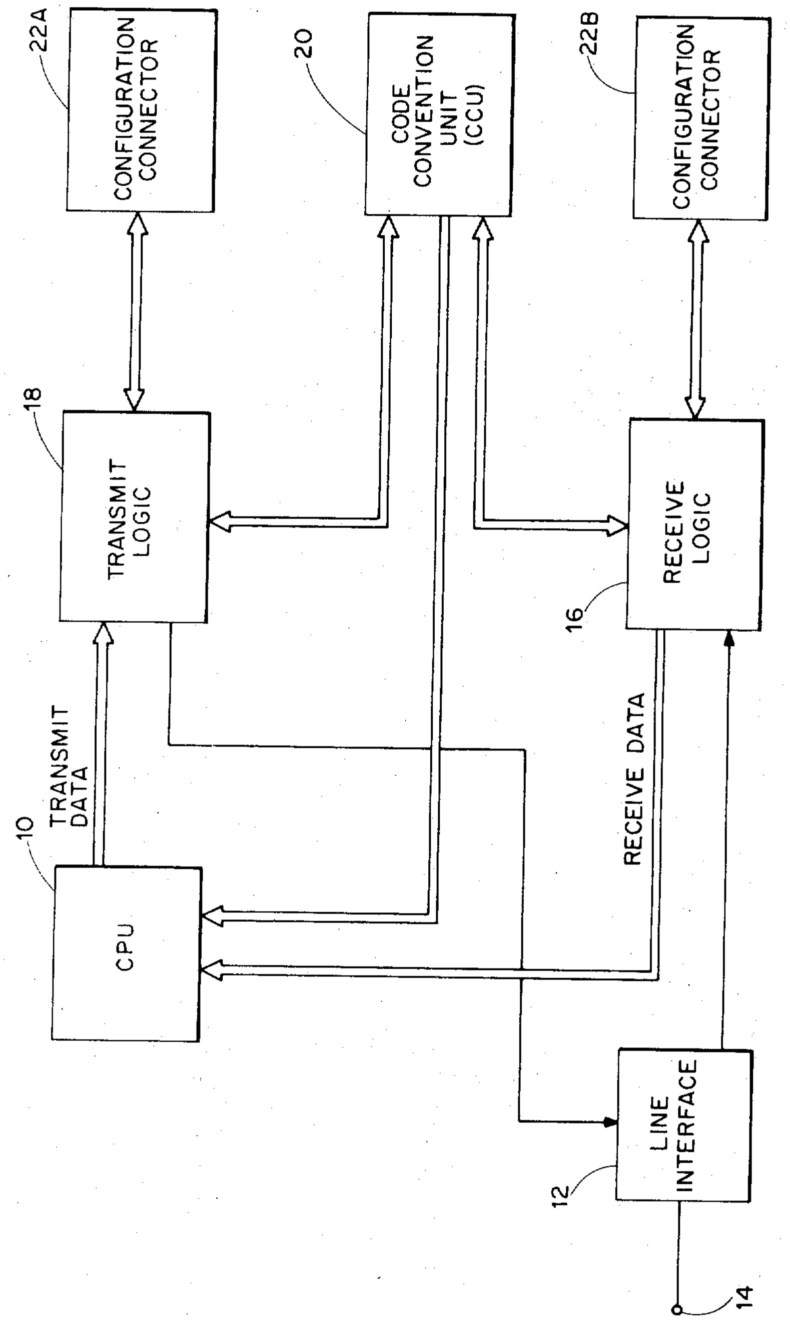
FIG. 1 is a general block diagram illustrating the overall operation of the apparatus of the invention.

The block diagram of FIG. 1 of the apparatus of the invention is shown with its major signal paths coupled with a processor (CPU) 10 and a line interface 12 further coupled to a communication line at terminal 14. The apparatus of the invention basically includes receive logic 16, transmit logic 18, a code convention unit 20 and a configuration connector 22 divided in two parts 22A and 22B for ease of illustration.

The apparatus of the invention basically functions to provide full duplex data transfer over a single synchronous communication line. The receive logic 16 thereof provides a serial to parallel bit conversion of the data characters received via line interface 12. The receive logic also functions to provide a check for synchronous characters in the synchronous communication, to provide a parity check and to indicate an overrun condition as hereinafter described. The transmit logic 18 is coupled to receive in parallel all bits of a character from CPU 10 and to convert such parallel received bits into a serial stream of bits for transmission via the line interface 12 over the communication line. The transmit logic 18 also provides apparatus for generating an even or odd parity or no parity bit at all, and to provide a synchronization (sync) character at the start of transmission of a message. The transmit logic 18 also includes apparatus for indicating an underrun condition to CPU 10 as will be hereinafter described.

Both the receive logic 16 and the transmit logic 18 are coupled with the configuration connector 22. Configuration connector 22 is merely a connector having electrical terminals or pins coupled with certain inputs and outputs wherein some of the pins are coupled by jumper wires and wherein some of the pins have voltages or a ground signal supplied thereon to represent a binary one or binary zero respectively in order to provide versatility in configuring the code characters such as SYN used with the apparatus of the invention in a quick and easy manner. Thus the configuration connector 22 is capable of being pre-wired for the number of bits in a character which are conventionally 6, 7 or 8 bits. Further, when a parity bit is generated, the configuration connector allows such parity bit to be configured into the correct bit position for the particular character length.

The code convention unit (CCU) 20 is coupled with both logic 16 and 18 as well as CPU 10. CCU 20 provides character identification and further may provide a conventional cyclic redundancy check (CRC) and/or longitudinal redundancy check (LRC) on the characters received. The code convention unit is operative to reduce the overhead required by the CPU 10 by identi- 'ying various particular characters received and transmitted via logic 16 and logic 18 respectively.

Figure 2:
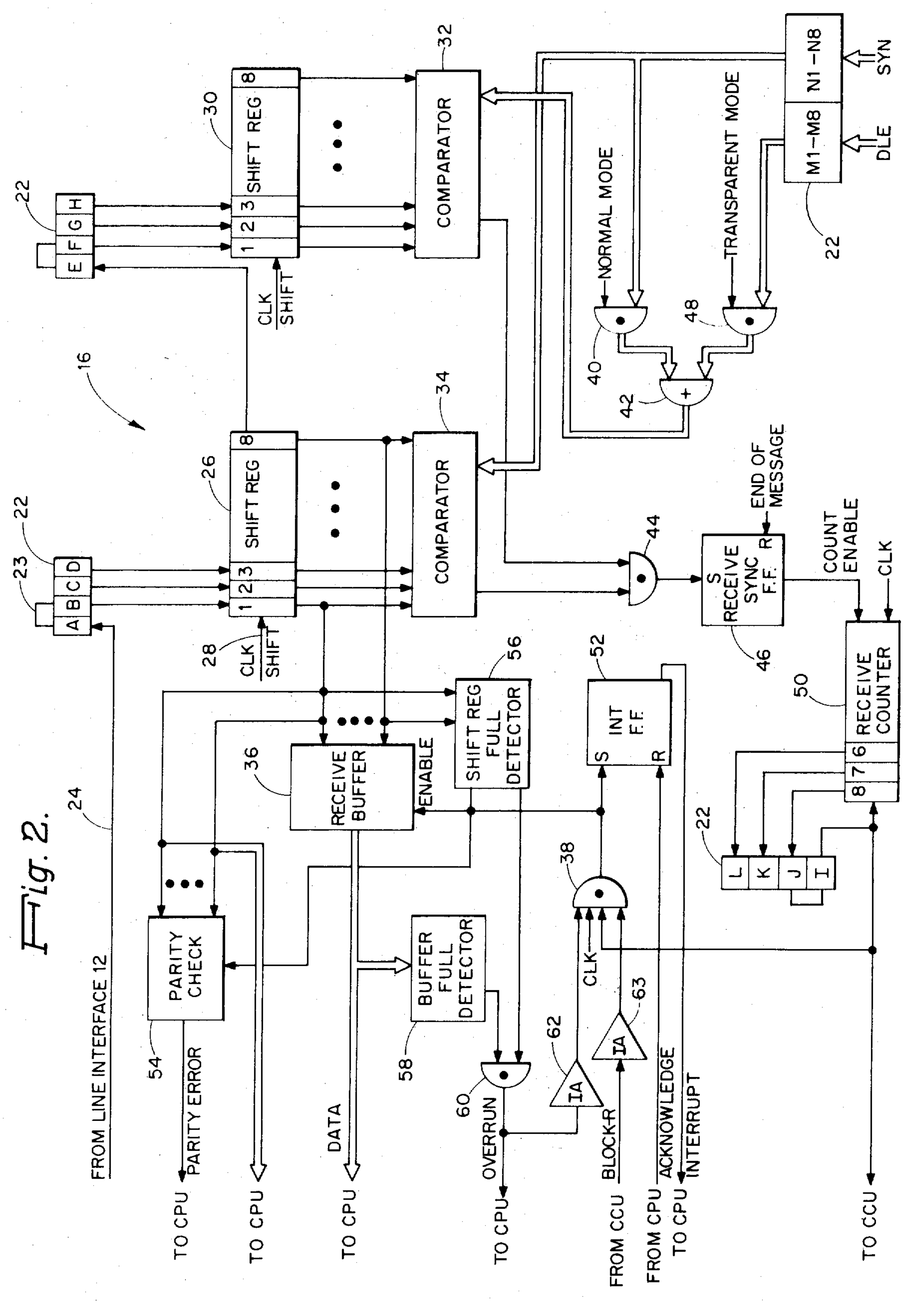
FIG. 2 is a detailed logic diagram of the receive logic of the present invention.

Now referring to FIG. 2, the receive logic 16 shall be explained. Bits of a character are received in a serial stream from interface 12 on line 24. Line 24 is shown connected to pin A of configuration connector 22. Configuration connector 22 is shown separated in different locations of FIGS. 2 and 3 for convenience of illustration only, it being understood that configuration connector 22 may be one or more of such connectors. Pins B, C, and D are connected to the first, second, and third stages or locations respectively of shift register 26. Depending upon the length of the character to be received on line 24, the connection is made on the back mating side of configuration connector 22 via a simple jumper wire 23. For example if the character to be received is 8 bits in length, then pin A is tied to pin B of configuration connector 22 such that the bits received on line 24 are received at the first stage of shift register 26. If the character length is 7 bits, then the jumper would have been tied from pin A to pin C or further if the character length was 6 bits, the jumper would have been tied between pins A and D. Thus in the latter case, this would enable the bits to be received directly at the third stage of register 26 such that upon 6 clock counts, the first bit of a character now resides in shift register stage or location 8. The bits of a character received on line 24 are shifted in correspondence with the rates set by the clock on line 28. For the first character of a message, and in the synchronous mode of operation, the first character received in shift register 26 would be a sync character. Further, it is normal to provide at least two such sync characters at the start of a message and accordingly the second character of the message would also be a sync character. The type of sync character is determined by the mode of operation of the apparatus of the invention.

There are generally two modes of operation of the apparatus of the invention, the normal mode and the transparent mode. The normal mode is generally used when standard and specifically identified characters are transferred over the communication line where the character identification features of the invention are utilized. The normal mode is also used when just establishing synchronization for an incoming message and finally terminating the message. The transparent mode is used when a random pattern of data bits, such as that generated by a radar device, are transferred over the communication line. In the transparent mode character identification is not generally utilized so as for example not to prematurely terminate an incoming message, should the random bits received be identified with those required to terminate the message. Should the message require a synchronization check during the transfer of character therein, then the transparent mode is also utilized during such synchronization so that the transparent mode sync characters are not recognized as data. The purpose of synchronization, particularly at the start of the message, is to allow character boundaries to be identified with respect to the continuous data bits being received.

In the normal mode of operation, two sync characters, namely SYN characters, are received at the start of the message. During the transparent mode of operation, the sync characters used are the DLE and the SYN sync characters. Thus, once the synchronous characters are recognized during the normal mode, then the transfer of the characters in the message from received logic 16 is processed and received by CPU 10, in either the normal or transparent mode. Synchronization may also be checked during the transfer of the body of the message by sending sync characters in the transparent mode.

Shift register 30 is provided in order to detect the additional synchronous character at the start of the message. Thus, shift register 30 receives the first synchronous character via shift register 26 and pins E and F, G or H depending upon the length of the character of configuration connector 22. The shift registers are used for message synchronization purposes because the character boundaries have not been established. Shift register 30 is coupled to comparator 32 in order to detect the first synchronous character whereas shift register 26 is connected to comparator 34 in order to detect the second synchronous character. Shift register 26 is also coupled to receive buffer 36, however receive buffer 36 is not capable of receiving data until AND gate 38 is fully enabled, as shall hereinafter be explained. Once the character is in receive buffer 36, it may be transferred to the CPU 10.

As hereinabove explained, comparators 32 and 34 are utilized to detect the first and second sync characters respectively. The other inputs to comparators 32 and 34 are derived from pins M1 and M8 and N1 through N8 of configuration connector 22. Sync character DLE which is utilized for the first sync character of the transparent mode is provided through pins M1 and M8 whereas the SYN character is provided via pins N1 through N8. With reference to the normal mode of operation, such condition enables AND gate 40 to pass the sync SYN character on pins N1 through N8 to OR-gate 42 and finally to the other input of comparator 32. The SYN character is also provided directly via pins N1 to N8 to the other input of comparator 34. Thus, when two SYN characters have been received, from the line interface 12 and are in shift registers 26 and 30, a comparison is made and should a positive comparison be made by both comparators 34 and 32, AND gate 44 is fully enabled to set receive sync flip-flop 46. On the other hand, if the mode is the transparent mode, AND gate 48 is enabled to pass the DLE character via pins M1 through M8 through OR-gate 42 to the other input of comparator 32. The SYN character during the transparent mode does not reach the other input of comparator 32 because of the inhibiting of AND gate 40. Also, as was the case for the normal mode, the SYN character is received at the other input of comparator 34. The consecutive receipt of the DLE and SYN characters establishes the transparent mode and fully enables AND gate 44 in a like manner as for the normal mode of operation thereby setting receive sync flip-flop 46.

Thus, with the receive logic 16 indicating synchronization, thereby indicating that the next character to be received is the first character in the message, the setting of flip-flop 46 enables counter 50 which is incremented thereafter at each clock count. Receive counter 50 is capable of counting the decimal 8 which is in this example the maximum bit character length. If the system is utilizing 8-bit characters, the stage of counter 50 which generates the decimal 8 is coupled to the pin J of configuration connector 22. Pin J is coupled to pin I by a jumper to reset the receiver counter 50. If there are six bit characters, then the jumper would be connected from pin I to pin L of configuration connector 22 and receive counter 50 would be reset as soon as the counter 50 counted to the decimal 6.

In addition to resetting counter 50, the signal received via pin I also partially enables AND gate 38. This indicates that a full character has thus been received in shift register 26 so that if the conditions are correct, the character in shift register 26 may be received by receive buffer 36. It should be noted that shift register 30, although it receives the successive characters which have been previously received by shift register 26 is not utilized other than during the synchronization of the receive logic 16, even though the characters are shifted therein. To inhibit this don't care situation would have required additional logic which is not necessary.

Counter 50 having counted to the character length, partially enables AND gate 38 as does the clock signal. If there is no overrun condition as hereinafter described, and if the code convention unit 20 does not generate a block signal via inverting amplifier 63 as will also be hereinafter described, then the AND gate 38 is fully enabled thereby setting interrupt flip-flop 52 and causing an interrupt signal to be sent to the CPU 10 to indicate that the character is ready for transfer to the CPU 10. Flip-flop 52 is reset upon the acknowledgement of the interrupt by the CPU. The signal from AND gate 38 also enables buffer 36 to receive the character from register 26. At the same time, parity check circuit 54 and shift register full detector 56 are also enabled to receive such character from register 26. The character from register 26 is also transferred directly to the code convention unit 20 for the purpose of detecting the type of character and indicating the identity of the character to the CPU and further for generating a Block (Block-R) signal under appropriate conditions.

The overrun signal is generated when both the receive buffer 26 is full and accordingly has not transferred the last character received to the CPU 10, and the shift register 26 has also received a character and is ready to transfer the character to the buffer 36. Detectors 56 and 58 may be all binary zero detectors if register 26 and buffer 36 are reset with binary zeroes after each transfer therefrom or detectors 56 and 58 may be coupled to detect changes or lack of changes of data in the register 26 and buffer 36. Thus, when detectors 56 and 58 indicate that the register 26 and the buffer 36 are respectively full, they each generate a signal which fully enables AND gate 60 thereby generating the overrun signal. This indicates to the CPU 10 that the character presently in the buffer 36 is a valid character but that the next character in shift register 26 will be an invalid character since register 26 is being written over by additional bits of the next character received on line 24. Accordingly, the overrun signal to CPU 10 will indicate this error condition and a retransmission of such character and/or message would be requested.

The inversion of the overrun signal is provided via inverting amplifier 62 so that when AND gate 60 is not enabled, a signal will be generated via inverting amplifier 62 to enable gate 38. Further, a conventional parity check circuit 54 detects the parity of the character received from shift register 26 and generates a parity error signal to the CPU if the parity of the just received character is incorrect. This condition might also generate a request from the CPU 10 for retransmission of the character and/or message.

Figure 3:
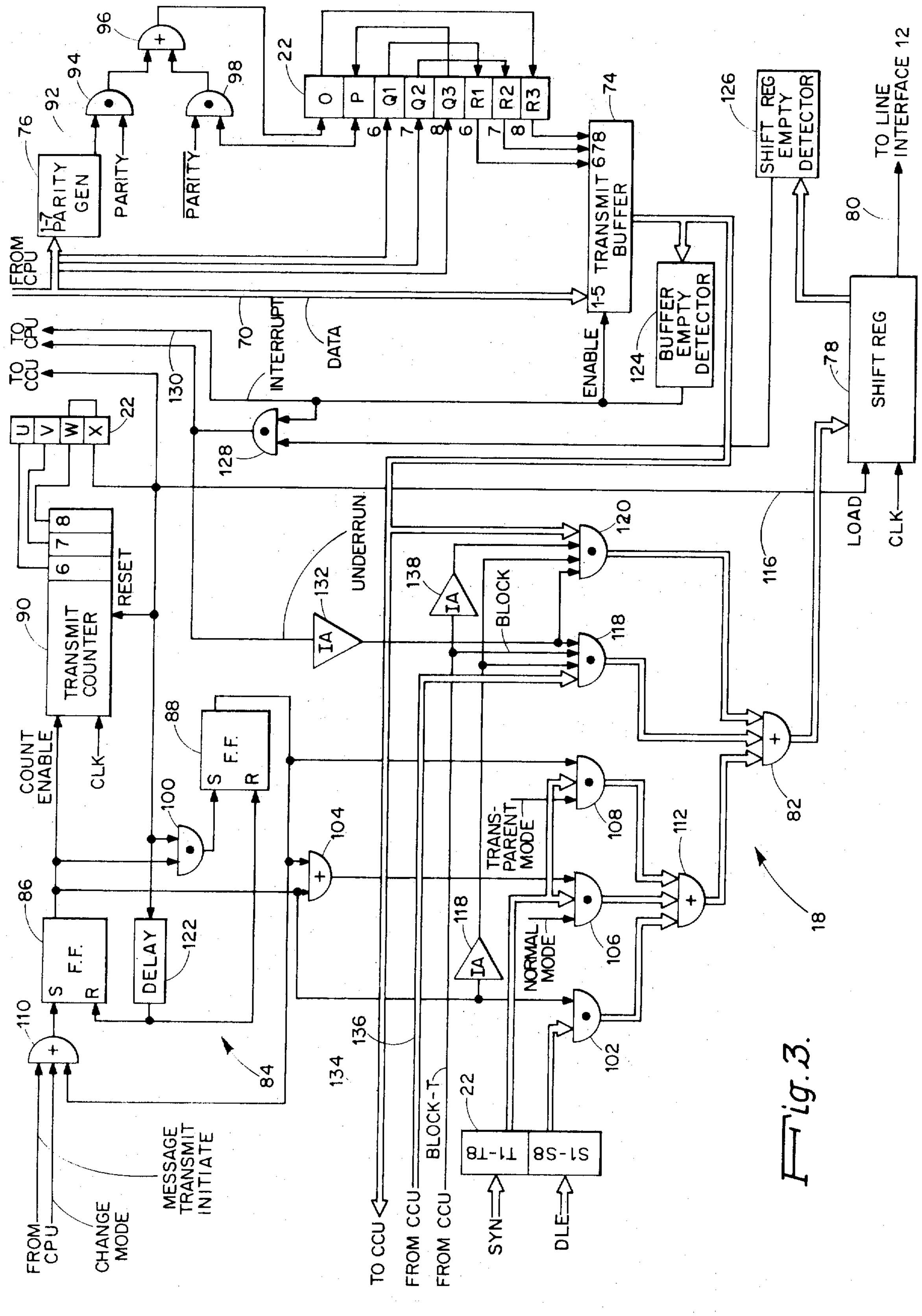
FIG. 3 is a detailed logic diagram of the transmit logic of the present invention.

Now referring to FIG. 3, the transmit logic 18 shall be described. Data is received from the CPU on line 70. A signal to initiate the message transmit is also received at one input of OR-gate 110 from the CPU on line 72. Basically, the transmit logic 18 includes a transmit buffer 74 coupled to receive a character by means of line 70 and parity generator 76. Transmit logic 18 also includes a shift register 78 which is coupled to shift bits serially on line 80 to line interface 12. Shift register 78 is coupled to be loaded with a character by means of OR-gate 82. The OR-gate 82 is coupled to receive a character from either the sync logic associated with pins S1 to S8 and T1 to T8 of configuration connector 22, from the transmit buffer 74, from the code convention unit 20, or in response to an underrun condition to be hereinafter described. The transmit logic 18 also includes timing logic 84 which includes two flip-flop 86 and 88 as well as a transmit counter 90.

A character is received on line 70 from CPU 10. The character must be at least six bits in length, but no greater than eight bits in length; the first five bits of the character are received directly from line 70. The other three bits are received via configuration connector 22. Parity generator 76 is also coupled with configuration connector 22 and accordingly to buffer 74. This allows the use of the configuration connector 22 to configure the length of the character and to enable the parity generator 76 to place the correct parity bit in the proper location in the transmit buffer 74. For example, assuming an eight bit character, wherein seven bits are data and the eighth bit is the parity bit, the first seven bits are received via line 70 at the input of parity generator 76. Parity generator 76 generates a parity bit either as even or odd parity as desired. Parity generator 76 is a well known device and may be that generator having a part number 8262 of Signetics Corporation. The parity bit is placed on line 92 and if parity is to be used for this particular character, then AND gate 94 is enabled and a parity bit from line 92 is transferred via OR-gate 96 to the 0 pin of configuration connector 22. The 0 pin is connected to the R3 pin of connector 22 wherein the R3 pin represents a connection to the eighth bit position of the buffer 74. Accordingly, the parity bit is loaded into transmit buffer 74 at the eighth bit location. Since the character is an eight bit character, the sixth and seventh bits which are received on line 70 are wired into and received by buffer 74 at its input terminals 6 and 7 by means of jumpers coupled between terminals Q1 and R1 of connector 22 and Q2 and R2 of connector 22. If there is no parity, for a particular character, AND gate 98 is enabled in order to clamp the level of bit 8 as desired. If the character were a seven bit character wherein six bits comprised the data and the seventh bit was a parity bit, then the parity generator 76 would have been coupled via line 92 to pin R2 of connector 22 rather than pin R3. The connection for the sixth bit via pin Q1 and pin R1 of connector 22 would remain unchanged. The connection for the eighth bit would be inconsequential. Thus, the configuration connector 22 would allow the parity bit to be loaded into buffer 74 at the desired location by simply utilizing jumper wires on the configuration connector 22.

Having loaded buffer 74 with data, logic 84 will now be discussed. The CPU 10 generates the message transnit initiate signal which is received by OR-gate 110 on line 72 to set flip-flop 86. This enables the commencement of counting of transmit counter 90. The setting of flip-flop 86 also partially enables AND gate 100. Further, the signal generated at the output of flip-flop 86 is coupled to partially enable AND gate 102, as well as via OR gate 104, partially enabling AND gate 106. AND gate 102 is coupled to receive the DLE character via terminals S1 through S8 of connector 22. The DLE character is the first character to be transmitted in establishing the transparent mode. AND gate 106 as well as AND gates 108 and 110 are coupled to receive the SYN character via pins T1 through T8 of connectors 22. The SYN character is the first synchronous character to be transmitted in the normal mode and the second character to be transmitted in both the transparent and normal modes. Thus, when flip-flop 86 is first set, and with the system in the normal mode, AND gate 106 is fully enabled to pass the SYN character therethrough, through OR-gates 112 and 82. The SYN character is loaded into shift register 78 when the transmit counter 90 has counted the full character length. It should be noted that shift register 78 normally shifts bits to the right to line 80 each time a clock pulse appears on line 114 but that when the load signal is received from transmit counter 90, the operation changes such that instead of shifting characters in shift register 78, a full character is loaded in bit parallel via OR-gate 82. Further, it should also be noted that transmit counter 90 is coupled to count each time a clock pulse appears when the counter is enabled via the setting of flip-flop 86. Also the sixth, seventh and eighth locations or stages of counter 90 are coupled to terminals U, V, and W respectively of connector 22. For an eight bit character, the W terminal is wired to the X terminal which allows the resetting of the counter 90 in addition to other actions including the receipt of the load signal on line 116 at the load input of the shift register 78.

Thus, the SYN character is loaded into the shift register 78. AND gates 118 and 120 are inhibited from transferring a character into shift register 78 when the load signal is received on line 116 because of the connection via inverting amplifier 118 coupled to receive the set output of flip-flop 86. It will be seen that flip-flop 86 resets after two synchronous characters are enabled to be transmitted by shift register 78 adter which time, gates 118 and 120 are no longer disabled via such connection from flip-flop 86. The second synchronous character during the normal mode is also transferred via AND gate 106 by the setting action of flip-flop 88. Flip-flop 88 is set in response to the enabling of AND gate 100 when flip-flop 86 has been set and after counter 90 has counted to the full character length. The set output of flip-flop 88 is received via OR-gate 104 and thereby enables AND gate 106 so that the second SYN sync character is transferred into shift register 78, it being noted that by this time, since the clock rate received by shift register 78 is the same as the clock rate of counter 90, that the first synchronous character has been transferred via line 80. If CPU 10 instructs that a change be made from the normal mode to the transparent mode, the CPU issues the Change Mode signal which enables AND gate 102 via the setting of flip-flop 86 so that the DLE character is transferred therethrough into shift register 78. The second synchronous character during the transparent mode is the SYN character which is enabled again by the setting of flip-flop 88 which thereby fully enables AND gate 108 to pass the SYN character through OR-gates 112 and 82 into shift register 78. After a delay sufficient for the last mentioned operation, as generated by delay device 122, both flip-flops 86 and 88 are reset. This accordingly disables any transfer of a character via AND gates 102, 106 or 108. Further, the resetting of flip-flop 86 thereby partially enables the other AND gates connected to the inputs of OR gate 82. Subsequent to this initial synchronous character generation, unless other events occur, AND gate 120 is fully enabled to pass the data from transmit buffer 74 via OR gate 82 into shift register 78. This is the case unless an underrun signal is generated or a block signal is generated.

The underrun signal is generated when the transmit buffer 74 is empty as detected by buffer empty detector 124 and when the shift register 78 is empty as detected by shift register empty detector 126. These two conditions thereby fully enable AND gate 128 which generates the underrun signal to the CPU to indicate this condition and further to enable the operation of timing logic 84 to send the synchronizing pattern SYN SYN or DLE SYN as described above on the line via shift register 78 so that synchronization is not lost. The detection of the buffer 74 being empty also in addition to partially enabling AND gate 128 generates an interrupt signal on line 130 and enables the transmit buffer 74 to receive another character from the CPU 10. Thus, after the synchronizing characters are transferred via OR-gate 112 to line interface 12, the character from transmit buffer 74 is transferred via AND gate 120 to the interface 12 unless there is another underrun condition in which case synchronizing characters are again transferred via AND gate 100, to interface 12. The underrun condition inhibits any transfer via AND gate 120 and AND gate 118 by means of the inverting amplifier 132, connected to receive the underrun signal.

The code convention unit (CCU) 20 also generates characters in response to certain conditions dependent upon the character received from transmit buffer 74 on line 134. The character received from the CCU 20 on line 136 is passed via AND gate 118 which is enabled in response to the block signal from the code convention unit 20. The Block signal disables AND gate 120 via inverting amplifier 138.

Thus it has been seen that by use of the configuration connector 22, that the character length is configured and that the parity bit position is also correctly inserted. Further, the synchronization pattern is easily configured. Also, the receive logic 16 and the transmit logic 18 are coupled to the code convention unit 20 to provide further features as shall be presently explained.

Figure 4:
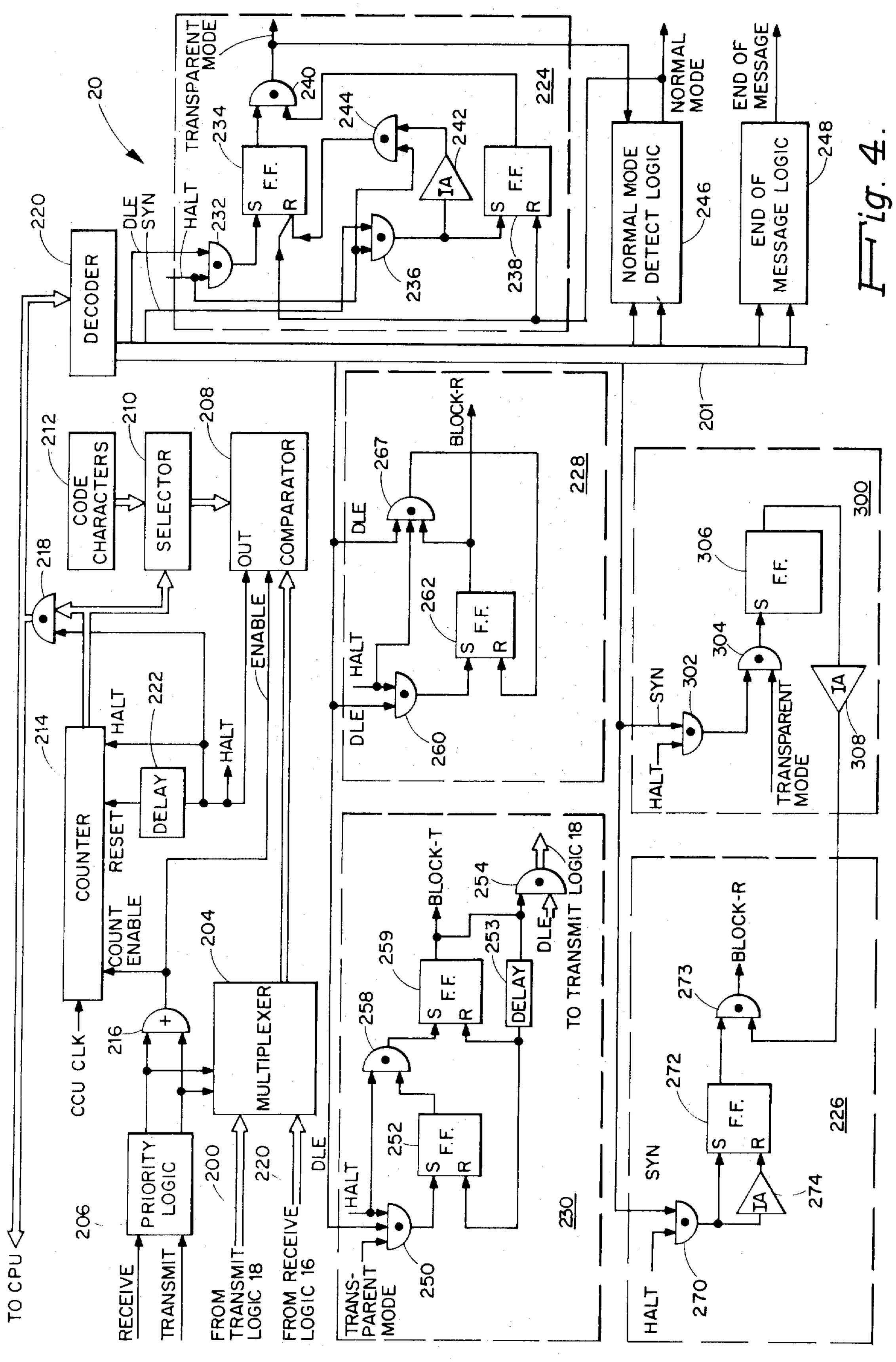
FIG. 4 is a detailed logic diagram of the code convention unit of the apparatus of the present invention.

Now with reference to FIG. 4, the code convention unit 20 is illustrated. Data is received from the transmit logic 18 on line 200 and from the receive logic 16 on line 202. Both lines 200 and 202 are selected by means of a multiplexer 204 which is enabled by one of two signals received from priority logic 206. The inputs to priority logic 206 indicate either the receive mode of operation or the transmit mode of operation, it being understood that either of the last mentioned modes may include the transparent or normal mode of operation. Depending upon the priority of either of such modes, the logic 206 is implemented so that for example should there be a request from both the receive and transmit modes of operation, the logic 206 will select one of such modes for operation. Usually the receive mode will be given higher priority because of the need to capture incoming data on a continuing basis whereas the transfer of characters in the transmit mode may wait because synchronizing characters are inserted by the logic if a underrun condition should occur. Multiplexer 204 may be simple two AND gates, one of which is coupled to receive the data on line 200 and the other of which is coupled to receive data on line 202. Each of the AND gates might be enabled by the respective signals from priority logic 206. The output of multiplexer 204 is coupled to one input of comparator 208. The other input to comparator 208 is received from selector 210 which has as its input the code characters 212. The code characters 212 may be nothing more than a plurality of characters coupled on another configuration connector similar to connector 22 wherein the characters to be compared are pre-wired in the mating portion of the connector. One or more code characters describe a specific operation.

Assuming that up to 16 code characters may be included in code characters 212, then a method must be utilized to select the characters for comparison by comparator 208. This is done by use of a counter 214 whose outputs are consecutively connected to components in the selector 210 to allow only one of code characters 212 to be coupled at a given time to the input of comparator 208. Thus, selector 210 may include up to 16 AND gates, one input of each being coupled to receive a particular code character and the other input of each AND gate coupled to receive one output of the 16 outputs of counter 214. Counter 214 is clocked at a higher rate than the clock of either the receive or transmit logic. This must be the case, since basically the code convention unit 20 is shared between the receive and transmit logic, and since there must be 16 comparisons made in a character time. Accordingly, in one embodiment, the frequency of the CCU clock now made sixty-four times faster than the frequency of the receive and transmit logic clock.

The counter 214 is enabled via the two signals received at multiplexer 204 from logic 206. Either one of these two signals is coupled via OR-gate 216 to produce a signal which enables the counting of counter 214. The output of OR-gate 216 also enables the comparator 208 to make comparisons. The output of comparator 208 is coupled to various points as shall hereinafter be discussed, such output being referred to hereinafter as the halt output or halt signal.

Thus, as data is received either from logic 16 or 18, it is coupled to one input of comparator 208 by means of priority logic 206 and multiplexer 204. At the same time, the counter 214 is enabled and starts counting. When a positive comparison is made between one of code characters 212 via selector 210, the output of comparator 208 is generated thereby causing the halt signal to halt the count of counter 214. This action enables AND gate 218 thereby allowing the halted count of counter 214 indicating the character just identified to be sent to the CPU 10 via a decoder if necessary and to other logic also shown in FIG. 4 via decoder 220. After a short delay, produced by delay 222, the counter is reset or in the alternative the counter is allowed to count through to the point where it automatically resets after it reaches the count of 16.

The following description describes operation performed by the CCU 20 based upon the identification of code characters when the counter 214 is halted. These operations can be seen from FIG. 4 where logic devices in dottled lines are shown coupled to bus 201 for providing such different operations. The purpose of logic 224 is to automatically provide transparent mode operation upon the receipt of two characters in sequential order. Thus, the halt signal and the receipt of a signal representing the DLE character enables AND gate 232 thereby setting flip-flop 234 and further the receipt of a signal representing the STX character and the halt signal enables AND gate 236 thereby setting flip-flop 238. Setting both of flip-flops 234 and 238 enables AND gate 240 thereby generating the transparent mode signal. Upon the enabling of AND gate 236, the flip-flop 36 is reset via inverting amplifier 242 and AND gate 244. The transparent mode signal resets the logic of the normal mode detect logic 246 which includes logic similar to that logic shown in block 234, in that two sequential characters must be received in order to change from the transparent mode to the normal mode. End of message detection logic 248 is also similar to the logic 224 in order to produce the end of message signal for utilization in the apparatus of the invention. Accordingly, in either the transmit or receive mode of operation, the transparent mode signal is generated in order to enable the appropriate logic. The transparent mode and/or the normal mode may also be set by manual means.

Logic 230 is utilized in conjunction with the transparent mode when it is required to send a DLE character as a data character rather than a synchronization character. In this case, two DLE characters are sent since in the transparent mode, the first DLE character will always be inhibited from going to CPU 10. Thus, in such case, and with the transparent mode signal generated, the halt signal and the DLE character as decoded and which is to be transmitted as data, are received to enable AND gate 250. This enabling of AND gate 250 sets flip-flop 252, and the DLE data character is allowed to be transferred via buffer 74 in FIG. 3 to line interface 12. Upon generation of the next halt signal, AND gate 258 is enabled to set flip-flop 259 thereby generating the Block (BLOCK-T) signal so that the character presently in the buffer 74 will not be sent until another DLE character is sent via AND gate 254 to logic 18 via line 256. The flip-flops are reset after a delay caused by delay 253. The DLE character sent via gate 254 may be pre-wired on another configuration connector and in fact the DLE character may be received directly from code characters 212 so that the DLE character is sent to the transmit logic 18 on line 256. As will be seen, the first DLE character sent was the actual data character which was to be transmitted and that the second DLE character was inserted to preserve the nature of the DLE character or data. On receipt the first DLE character is deleted and the second DLE character is used as the data character as will now be described.

Logic 228 is utilized for receipt of the DLE character as a data character in the transparent mode. Logic 228 includes an AND gate 260 which is enabled upon the receipt of the first DLE character and halt signal. This sets flip-flop 262 thereby generating the Block signal which prevents the DLE character from being sent to the receive buffer 36 of FIG. 2. Flip-flop 262 is reset upon the enabling of AND gate 267 when the halt signal and the second DLE character as decoded are received at the two of the three inputs thereof. This allows the second DLE character to be transferred as data to the receive buffer 36, in FIG. 2. Thus, by sending a DLE character in the transparent mode, the next character is treated as a control character or as data if it is a DLE character. Also, logic 228 is utilized to generate the Block signal for use with logic 224.

Thus, for example, the logic of end of message logic 248 would in response to a DLE and a control character, treat such characters to generate the end of message signal.

Also shown in FIG. 4 is logic 226 which is utilized to reduce the number of SYN characters which are received by the CPU 10. By logic 228 any SYN characters received are not allowed to be received by CPU 10 thereby reducing the overhead requirements thereof. Thus, when the first SYN character is received via logic 226, AND gate 270 is enabled in response to the halt signal. This sets flip-flop 272 thereby generating the Block signal via SND gate 273 whose other input is normally enabled so as to prevent transfer of the SYN character to CPU 10. Flip-flop 272 is reset via inverting amplifier 274 when the halt signal is removed. Logic 226 is also used in conjunction with the logic 224 thereby preventing the SYN character from such transfer to the CPU 10. Should there be a requirement to send the SYN character as a data character to the CPU, then the device is changed to the transparent mode. The DLE SYN characters establishing the transparent mode are inhibited from transfer to CPU 10. The next SYN, a data character, is allowed to be so transferred by logic 300.

Logic 300 includes AND gate 302 which is enabled when the SYN character as decoded and the halt signal are received. If the device is in the transparent mode, the enabling of AND gate 302, enables AND gate 304 to set flip-flop 306. When flip-flop 306 is set, AND gate 273 of logic 226 inhibits the generation of the Block signal thereby allowing the SYN character to be transferred to CPU 10 as data. When flip-flop 306 is not set, then AND gate 273 is enabled because of inverting amplifier 308 so that the logic 226 may generate the Block signal.

Thus, it can be seen how the logic of the code convention unit 20 reduces the requirements of both the receive and transmit logic so that the code detection and other special functions are to the extent possible not duplicated for both the receive and transmit logic. Further, it can be seen that the CPU 10 is informed of exactly what character has been received by means of the halted count output of counter 214. In this way, only four bits are received by CPU 10 thereby indicating the nature of the character just received and thereby minimizing the memory space and the overhead required by the CPU 10 in determining which character has been received.

Code convention unit 20 may also be implemented in conjunction with the aforementioned logic operations to perform longitudinal redundancy checks and/or cyclic redundancy checks by conventional means not shown upon the data received on line 202.

Having described the invention, what is claimed as new and novel and for which it is desired to secure Letters Patent is:

1. Apparatus for transferring data characters, each having a plurality of bits, between a data processor and a communication line, said apparatus comprising:

A. receive logic for converting bit serial characters received from said line to bit parallel characters;

B. transmit logic for converting bit parallel characters to bit serial characters for transfer over said lines;

C. bit routing means included in both said receive logic and said transmit logic;

D. a code unit coupled to receive bit parallel characters from said receive logic and from said transmit logic, said code unit comprising 1. means for detecting the identity of said characters; and
2. means for performing predetermined logic operations in response to the identity of certain ones of said characters;

E. means for configuring said bit routing means included in said receive and transmit logic in order to adapt to a predetermined number of bits in said characters;

F. means, included in the coupling between said code unit and said receive logic and said transmit logic, for enabling said code unit to be time shared between said receive logic and said transmit logic; and G. wherein said means for detecting comprises:

1. a comparator having first and second inputs;
2. means for selecting either said character from said receive logic or said character from said transmit logic for coupling to said first input;
3. means for providing a plurality of code characters;
4. means for sequentially selecting each of said plurality of code characters for coupling to said second input; and
5. means for indicating the identity of said characters provided by either said receive logic or said transmit logic when a positive comparison is made by said comparator.

2. Apparatus as in claim 1 wherein said means for indicating and said means for sequentially selecting comprise:

A. counter means;

B. means for enabling said counter means for counting when either said characters from said receive logic or said characters from said transmit logic are coupled to said first input;

C. means for incrementing the count output of said counter means when said counter means is enabled for counting;

D. a plurality of gate means each coupled to transfer one of said code characters to said second input in response to different counters as incremented from said counter means; and E. means for halting the incrementing of said counter means when said positive comparison is made, whereby the count of said counter means when halted indicates the identity of said character provided by either said receive or transmit logic.

3. Apparatus as in claim 2 wherein said receive logic and said transmit logic include clock means for enabling the transfer of said characters at a first frequency, and wherein said means for incrementing includes further clock means for incrementing said count at a second frequency, said second frequency greater than said first frequency, and said second frequency determined by the frequency of said first frequency, the time shared use of said code unit for both said receive logic and said transmit logic, and the number of said plurality of code characters.

4. Apparatus as in claim 1 wherein said means for performing predetermined logic operations comprises means for detecting the sequential occurrence of a first and a second character each identified by said means for indicating and means responsive to said sequential occurrence for enabling the operation of further logic means.

5. Apparatus as in claim 1 wherein said means for performing predetermined logic operations comprises:

A. logic means for inhibiting the transfer of a first character identified by said means for indicating; and B. further logic means responsive to said first character for enabling the transfer of a second character.

6. Apparatus as in claim 5 wherein said first character and said second character are the same, wherein said first character is a character utilized to provide synchronization of said apparatus, and wherein said second character is a data character.

7. Apparatus as in claim 1 wherein said means for performing predetermined logic operations comprises:

A. logic means for inhibiting the transfer to said processor of synchronous characters identified by said means for indicating; and B. means for disabling said logic means for inhibiting when an apparent synchronous character is to be transferred to said processor as a data character.

8. Apparatus as in claim 1 wherein said means for configuring comprises at least one electromechanical connector having electrical terminals coupled so that one terminal is connected to one of at least two other terminals, said two other terminals coupled to respective inputs of said bit routing means and said respective inputs sensitive to the number of bits in a character, whereby said connection from said one terminal to one of said two other terminals enables the proper one of said respective inputs to be connected to said one terminal.

9. Apparatus as in claim 1 wherein each of said code characters is identified by a pattern of logic one's and zero's and wherein said means for providing a plurality of code characters comprises:

A. a first portion of an electromechanical connector having terminals connected in circuit with said means for sequentially selecting;

B. a second portion of said connector having terminals coupled for making electrical contact with said first portion;

C. means for providing first and second potentials; and

D. means for coupling said first and second potentials to said terminals of said second portion in an arrangement corresponding to the binary pattern of said logical one's and zero's of each of said code characters.

10. Apparatus as in claim 1 wherein said means for configuring comprises at least one electromechanical connector having electrical terminals coupled so that one terminal is connected to one of at least two other terminals, said two other terminals coupled to respective inputs of said bit routing means and said respective inputs sensitive to the number of bits in a character, whereby said connection from said one terminal to one of said two other terminals enables the proper one of said respective inputs to be connected to said one terminal.

11. Apparatus as in claim 1 wherein both said receive and transmit logic each include counters for maintaining synchronization of the number of bits in each of said characters, said counters being incremented from a reset condition a number of times corresponding to the number of bits in a character before being reset again, and wherein said means for configuring comprises at least one electromechanical connector having electrical terminals coupled so that for each of said counters one terminal is coupled to the reset input of the counter and at least two other terminals are respectively connected to those outputs of the counter which correspond to the number of bits of two different character lengths, and further comprising an electrical connection between said one terminal and one of said two other terminals.

12. Apparatus as in claim 1 wherein said receive logic comprises:

A. a first shift register coupled to receive bits of said characters serially from said line;

B. a second shift register coupled to receive bits of said characters after they have passed through said first shift register;

C. means for comparing the contents of said first and second shift registers with a predetermined synchronization characters;

D. means for establishing synchronization of said receive logic for further characters transferred over said line upon a positive comparison by said means for comparing;

E. means for generating a control signal for each character received after said synchronization is established; and F. means for enabling the bits of said characters in said first shift register to be transferred in parallel to said processor in response to said control signal.

13. Apparatus as in claim 12 further comprising:

A. a buffer coupled between said first shift register and said processor so that said character is transferred to said buffer in response to said control signal;

B. first means for indicating that said first shift register contains a full character;

C. second means for indicating that said buffer contains a full character; and

D. means for generating an overrun signal if both said first and second means for indicating indicate a full character when said signal is generated.

14. Apparatus as in claim 1 wherein said transmit logic comprises:

A. a transmit buffer coupled for receiving bit parallel characters from said processor;

B. a shift register coupled to receive a bit parallel character to be serially shifted by bit onto said line;

C. control means coupled to provide said bit parallel character to said shift register, said control means having a plurality of inputs for receiving bit parallel characters from different sources;

D. means for coupling one of said inputs to receive said bit parallel character from said transmit buffer;

E. means for providing a plurality of code characters;

F. means for coupling another of said inputs to receive one of said predetermined code characters;

G. means included in said control means for inhibiting the normal transfer of bit parallel characters from said transmit buffer to said shift register in response to a control signal; and H. means included in said control means for enabling the transfer of said code characters to said shift register in response to said control signal.

15. Apparatus as in claim 14 wherein each of said code characters is identified by a pattern of logic one's and zero's and wherein said means for providing a plurality of code characters comprises:

A. a first portion of an electromechanical connector having terminals connected in circuit with said means for sequentially selecting;

B. a second portion of said connector having terminals coupled for making electrical contact with said first portion;

C. means for providing first and second potentials; and

D. means for coupling said first and second potentials to said terminals of said second portion in an arrangement corresponding to the binary pattern of said logical one's and zero's of each of said code characters.

16. Apparatus as in claim 14 further comprising:

A. means for indicating that both said transmit buffer and said shift register do not include characters, said means for indicating generating an underrun signal in response to the lack of such characters; and B. means included in said control means for transferring synchronous characters over said line until a character from another source is ready for transfer over said line.

17. Apparatus as in claim 14 further comprising:

A. a parity generator coupled to receive all bits of a character from said processor, said generator generating a parity bit in response to the state of the bits in said character; and B. means for providing said parity bit to the appropriate location in said buffer with said bits of said character, wherein said character to be transferred over said line via said shift register includes said parity bit.

18. Apparatus as in claim 17 further comprising:

A. an electromechanical connector coupled to receive from said processor all bits of said character which are included in those character positions over the minimum character size;

B. wherein said transmit buffer is coupled to receive directly from said processor only those bits of said character which are included in said minimum character size;

C. means for providing said parity bit to said buffer by means of said connector; and D. means for providing circuits in said connector for said bits not included in said minimum character size and for said parity bit so that all bits of said character and said parity bit are provided to said transmit buffer in the designated location dependent on character length.

* * * * *